Patented June 13, 1944

2,351,256

UNITED STATES PATENT OFFICE 2,351,256

METHOD OF FERTILIZER DISTRIBUTION

Albert C. Fischer, Chicago, Ill.

No Drawing. Application June 10, 1940,
Serial No. 339,830

1 Claim. (Cl. 47—58)

This invention relates to a method of and facilities for use in controlling development of subsurface portions of plants with special reference to directly influencing the growth of their root systems and consequent improvement of the plant as a whole. This application constitutes a continuation-in-part of application Serial No. 8,715, filed February 28, 1935, and entitled Fertilizer, insecticide and seed distribution.

The said method and facilities contemplate the use of concentrated fertilizer preferably compounded with a moisture absorbing binder of colloidal character, with or without insecticide, herein understood to include ingredients in general that are repellent to influences obnoxious to plant life, although concentrated fertilizer alone may be used to realize the results of the invention to a measurably beneficial degree.

One object of this invention is to artificially supply concentrated fertilizer and moisture to growing plants, in a manner that is much more economical and productive of much better results as to the character of plants developed, than has been possible with methods of supplying concentrated fertilizer heretofore practiced. To this end the invention proceeds upon the principle of so locating the supply of plant food and moisture that they cannot be reached by the roots of the plant, otherwise than by growth through a substantial distance that initially exists between the root center and said food and moisture supply and having said supply so spread out in an approximatedy horizontal plane as to exercise tropism upon the roots in a large number of lines of force that diverge substantially from the root center and thereby broadening the feeding area and preventing congestion of roots and root-burning by too much fertilization concentration and creating a superior root system that benefits the plant as a whole.

The supply of concentrated fertilizer to seed, by mounting the seed directly upon or enveloping it by a strip of sheet-like material serving as a vehicle for the fertilizer, has long been known, but is not a practical solution of the problem of intense fertilization, for the reason that fertilizer in the immediate presence of seed or of young roots causes ingrowing and over-concentration, or other deformation of the root system, and consequent curtailment of the proportion of available plant food assimilated by the plant, and waste of a substantial proportion of fertilizer used.

The present invention teaches a method of and means for supplying concentrated fertilizer to plants, which, by superinducing development of a form of root system that greatly enlarges the area upon which the root system feeds and correspondingly increasing the spread of the root system, enlarges the proportion of available fertilizer assimilated, and the degree of plant development attained.

In these ends the method of the invention is broadly identified by developing the growth of young roots in a new type of growing bed in the upper part of which systems of initially developed young roots may be established by growing them from germinating seeds or by transplanting initially developed root systems from other germinating beds and locating, in a position that can be reached only by divergent growth of the root systems, a concentrated fertilizer, preferably compounded with a colloid, or colloids acting as a binder for the fertilizer, and by hygroscopic action maintaining in the presence of the fertilizer, moisture making the fertilizer available to the roots. This concentrated fertilizer and moisture bearing binder are not located in the immediate presence of the initial or young root systems, and much less in contact with them, but on the contrary, are vertically beneath the said young roots, a distance which, while not beyond the range of tropism of the young roots, is great enough and directionally so related to the root system as to enable an extended area of fertilizer compound, presented toward the roots, to excite in the roots, lines of tropism which at least counteract ingrowing of the roots and preferably are divergent, and consequently cause dispersion or automatic separation of the roots as they grow toward the fertilizer, and cause the roots, on reaching the surface of the fertilizer or immediate vicinity thereof, to feed at a greater number of separated points, and thus become more thoroughly nourished. Thus, one part of the present invention contemplates embedding of plant foods, and particularly extended areas of strong plant food, in the growing soil substantial distances from and in such directional relation to the root systems of growing vegetation, that the plant food will influence the direction of tropism, at least to the extent of counteracting ingrowing congestion of the roots, and preferably directional tropism on divergent lines, for the purpose and with the advantages, among others, of affording increased room for hair roots; reaching out of separate roots, or numerous rootlets to as many different points of contact on an extended food area, at each of which ample food and moisture are available; development of superior plant physique; and an improved root system form that better adapts the plant to withstand weather and other disturbances encountered by the portion of the plant that is above ground.

The sheet-like material, even if only a strip, arrests downward passage of water. It is at least, preferably, wide enough to have, and in practice does have a sectional form (e. g. trough-shaped) that enables it to retain water seeping to it through the soil, thereby introducing in the procedure, the possibility of depositing water upon the surface of the ground and collecting it in the presence of the fertilizer, where it can assist the roots. A sheet of material, if substantially a plane, will arrest downward seepage of water and induce even greater tropism, besides keeping the hygroscopic binder saturated.

Another object of the invention is to gradually introduce fertilizer into a growing bed, from a dimensionally, directionally and distally related body of strong fertilizer through means of a vehicle that holds it in sheet or stratum form, as distinguished from distributing and leaving subdivided fertilizer subject to leaching throughout the bed of soil; such gradual introduction of the fertilizer being particularly from an intermediate root-feeding stratum into a substratum where the roots can find nourishment after they have grown to, and passed the intermediate feeding stratum; to which end, a further feature of the present invention resides in incorporating fertilizer in a moisture retarding vehicular body forming an intermediate stratum of the bed where the fertilizer can gradually enter into solution in the moisture arrested at that level, and thereafter gradually seep through said intermediate stratum to a sub-soil stratum below, and there serve the root systems after they grow past the intermediate stratum.

Another object of the invention is to provide a vehicular stratum of fertilizer and moisture at an intermediate level in a bed of soil, and of such strength that it will dominate over the surrounding soil in influencing tropism of the root systems, and thereby insure development of a desired root form, in combination with an impervious or moisture-arresting septum of clay or its equivalent at the bottom of the soil bed, and leaving between it and said intermediate level, a sub-stratum of soil which is stocked with nourishment and moisture escaping past the intermediate level, and in which the root systems will find renewed nourishment when, in the healthy form, they have assumed under tropism, in growing toward the intermediate level, they grow past the latter and into said sub-stratum.

From the foregoing it will be seen that the present invention contemplates a process of artificially supplying to vegetation, plant-food, accompanied by moisture, which process, while it will yield measurably advantageous novel results with omission of some of its steps, may be illustrated in the realization of all its advantages, by the following procedure, to wit:

First, provide at a depth of say, twelve inches beneath the top surface of the ground, an impervious septum or water-arresting stratum of clay, for instance, one inch thick, which said septum may be laid, if desired, with one of the known stratifying implements for laying subsoils while the overlying soil is in place; then at a level intermediate between the said septum and the upper surface of the ground, say about six inches below the surface, and about five inches above the septum, introduce a vehicular strip carrying concentrated fertilizer, preferably compounded with a colloidal binder and aggregating about a quarter-inch in thickness; or introduce a similar thickness of fertilizer in subdivided form, with or without a hygroscopic ingredient, laid by the aforesaid stratifying implement; or preferably introduce in the absence of the over soil stratum, the herein described vehicular material, fertilizer material, and hygroscopic binder compounded into a sheet-like strip having structural integrity that enables it to retain its sheet like form while being manipulated into position, and then fill in the desired depth, say about 5¾ inches, of over soil above it; then about an inch or inch and a half below the upper surface establish plants with young root systems that are spaced above, but in tropism range of the sheet like fertilizing stratum and causing said root systems to grow toward the fertilizer stratum, which is of sufficient area to not only avoid drawing the rootlets toward a single spot or causing ingrowing confusion of the rootlets, but to induce downward divergence or fullness of the root systems, and furthermore, during the period of development of the root systems toward the fertilizer stratum, causing moisture deposited naturally or artificially upon the surface of the soil bed, to seep through the bed to the fertilizer stratum and there satisfying the hygroscopic quality of the binder, while a portion of such moisture, not taken up at the fertilizer stratum or held back thereat, passes beyond said stratum, with such plant food as may enter into solution with said moisture, into the sub-stratum of soil where such moisture and food will be stored until the root systems reach said sub-soil or until brought up and mingled with the over stratum, by sub-soil plowing in the preparation of a bed for the ensuing season. It will further be seen from the foregoing, and particularly by the procedure last described, that such embodiment of the invention involves use of a growing bed identified by the novel combination of an impervious moisture arresting septum at the lowermost level of the bed, a stratum of under soil resting upon and water-sealed by said impervious septum, and receiving and storing moisture and plant-food values in solution in said moisture that seeps through from above; a rooting stratum of oversoil in which plants are rooted at a level near the top surface of the bed; and an intermediate concentrated fertilizer stratum between the said storage stratum of under-soil and the said rooting stratum of over soil; this fertilizer stratum being in the first place, sufficiently strong to predominate the surrounding soil in general in its influence upon tropism of the roots; being in the second place, of sufficient area to set up lines of tropism that are not ingrowing, but exert a separating or spreading, or even divergent effect upon the individual roots; and being in the third place at a distance beneath the initial level of the young roots which, while well within the range of vigorous tropism, is nevertheless sufficient to cause the roots to react to such directional tropism and develop a healthy form by the time the roots reach the fertilizing stratum, and are ready to feed upon the wider area and receive greater nourishment than if drawn toward a single point.

Preferably, when plants are started from seed, they will be given their first impetus by a special coating applied to the seed in accordance with Letters Patent No. 2,168,332, issued August 8, 1939, and when propagated initially in a starting bed and transplanted to the bed of the present invention, the initial roots are coated in accordance with applications Serial No. 8,715, filed February 28, 1935, and Serial No. 341,381, filed June 19, 1940, Patent No. 2,314,928, March 30, 1943.

While colloids may be rendered non-drying to a large degree by using non-volatiles such as glycerin, the colloids used in practicing the present invention will preferably be reversible colloids, which can safely be permitted to dry out, for convenience, preliminarily to and during the merchandising of the sheet-like material of the invention, and which, even after drying, will have the inherent capacity of attracting moisture from the soil promptly after the embedding of the sheet-like material in the soil and by swelling, and gradually dissolving portions of the fertilizer, will render the latter available to the roots.

Among the colloids available for purposes of the present invention may be mentioned gelatine, gluten, kelp, and other sea weeds, agar, vegetable seeds, vegetable and animal glues, etc.

Among the fertilizers that may be used for purposes of the invention are nitrogen, potash, and phosphoric acid sources in general; manures and other natural fertilizers, commercial fertilizer and special plant foods such as Vigoro, Loma, bone meal, etc. In making a fertilizing stratum having physical integrity to enable it to be manipulated into position, strips of sheet material varying in thickness from fine tissue to heavy material, such as mulching materials, peat moss, shredded straw, linters, cottonseed hulls (with lint attached), etc., bound together by a suitable colloidal binder; may be used as a vehicle; and with such strips may be incorporated insect or parasite repellents, such as camphor, creosote, or carbolic acid in solution, or poisons in the form of powders. These ingredients may be used in addition to, or in substitution for fertilizer. By making the vehicular strips strong enough, they may be mounted in rolls on an implement having a plow that passes through the soil of the bed at a predetermined depth and leaves behind it the strip in the position desired.

The moisture retaining vehicle used in practicing the present invention may be made of many different materials, included among which are sponge rubber; transparent rubber; glass; Cellophane; paraffin paper; Celluloid paper; Celluloid film; peat-moss and the like chemically reduced to gelatinous condition and rolled into strips or sheets; clear Celluloid sheets; various sheets of fibrous structure, such as peat moss, fiberized grain stalks, sugarcane; cotton seed hulls with or without lint, linters, and various kinds of natural fibers, etc. I prefer to use in most instances materials which by decay or disintegration pass into the soil as humus or plant food. These materials may be precipitated from water as in paper making; felted; united into physical integrity by binders; and even spun into threads and woven. They may be rendered moisture retaining by fillers, binders or the like, with which they are impregnated. They may be made to carry fertilizer by impregnating them with the fertilizer, soaking them in, or sprinkling them by the solution of the fertilizer, or otherwise; or having the fertilizer adhered to them by the binder. They may be made into strips of sheet material by any of the known methods of producing sheets and cutting them into strips. They may be rendered moisture retaining in some degree by intercepting in flat, sheet or strip form, the gravitation or capillary transfer of moisture past them; by being given a form that will constitute them receptacles for moisture; and by incorporating in them or in compounds which they carry, an ingredient or ingredients having the capacity to absorb moisture, for example, colloids. These colloids are preferably reversible colloids that retain their hygroscopic quality even when dry, and which swell up and become deformable or pliable when dampened by the moisture which they attract.

These colloids or binders may be rendered non-drying or slow drying by incorporating with them non-volatile or slowly evaporative substances such as glycerin, for instance. They may be given extra physical resistance by including with them animal, vegetable, and mineral glues or adhesives.

It is understood that the present invention has to do with supplying plant life with sustaining elements such as food and moisture, as well as protective elements such as insecticides, parasite repelling remedies and elements banal to adverse influences in general which plant life is liable to encounter, all of which are included in the term plant-treating media as herein employed.

I claim:

In the art of promoting the growth of plants, the improvement which comprises laying at the bottom of a bed of soil, a moisture arresting septum, interposing in said bed at a level intermediate of the top of the bed and said septum, a substantially horizontal prefabricated self-sustaining and plant food-bearing sheet-like vehicular body which divides the soil bed into an upper growing stratum of soil and a lower moisture salvaging and plant-finishing stratum of soil; planting plants in the upper growing stratum of soil with root-systems spaced above, but within tropic range of said vehicular body whereby tropism-exciting food and moisture are applied through the medium of said vehicular body to the root systems, and while the plant roots are developing in the upper growing stratum.

ALBERT C. FISCHER.